United States Patent
Dande et al.

(10) Patent No.: US 11,019,070 B2
(45) Date of Patent: May 25, 2021

(54) DIFFERENTIATING BETWEEN ACTIVITIES OF MULTIPLE USERS USING SHARED ACCOUNTS TO ACCESS A COMPUTING SYSTEM

(71) Applicant: Bank of America Corporation, Charlotte, NC (US)

(72) Inventors: Pratap Dande, Jacksonville, FL (US); Manikumar Juttukonda, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 15/938,682

(22) Filed: Mar. 28, 2018

(65) Prior Publication Data
US 2019/0306172 A1 Oct. 3, 2019

(51) Int. Cl.
*H04L 29/06* (2006.01)
*G06F 16/51* (2019.01)

(52) U.S. Cl.
CPC ............ *H04L 63/105* (2013.01); *G06F 16/51* (2019.01); *H04L 63/102* (2013.01)

(58) Field of Classification Search
CPC ...... H04L 63/102; H04L 63/105; G06F 16/51
See application file for complete search history.

(56) References Cited

U.S. PATENT DOCUMENTS

| | | | |
|---|---|---|---|
| 8,060,920 B2 | 11/2011 | Livingston et al. | |
| 8,544,071 B1 | 9/2013 | Cato et al. | |
| 8,732,852 B2 | 5/2014 | Shu et al. | |
| 9,485,271 B1* | 11/2016 | Roundy | H04L 63/1441 |
| 2014/0282965 A1* | 9/2014 | Sambamurthy | G06F 21/31 726/7 |
| 2015/0121461 A1* | 4/2015 | Dulkin | H04L 63/1408 726/4 |
| 2017/0163666 A1* | 6/2017 | Venkatramani | H04L 63/1425 |
| 2018/0314925 A1* | 11/2018 | Gauci | G06N 3/0445 |
| 2019/0026792 A1* | 1/2019 | Alcombright | G06Q 10/06 |

OTHER PUBLICATIONS

James Alaniz <https://www.securit360.com/blog/best-practices-privileged-account-management-part-2/>.

* cited by examiner

*Primary Examiner* — Joseph P Hirl
*Assistant Examiner* — Chi D Nguy
(74) *Attorney, Agent, or Firm* — Banner & Witcoff, Ltd.; Michael A. Springs

(57) ABSTRACT

Aspects of this application describe a user identification utility that may monitor shared account activity on one or more computing devices. The computing devices may enable user accounts to access shared accounts, which may have different permissions than the user accounts. Based on detecting access to a shared account, the user identification utility may determine an indication of the user account, an indication of the shared account, and, if available, additional data corresponding to the user account. The user identification utility may store an association between the determined information. If the determined information satisfies a rule, the user identification utility may trigger an alert.

18 Claims, 3 Drawing Sheets

| User ID | Shared Account ID | Time | IP Address | Action | Alert? | |
|---|---|---|---|---|---|---|
| account1 | IT_ADMIN | Jan. 1, 2018 00:00:00 | 192.168.1.1 | ADD diagram.jpg | N | 370a |
| account1 | IT_ADMIN | Jan. 1, 2018 01:00:00 | 192.168.1.1 | DEL diagram.jpg | N | 370b |
| account2 | BUS_ADMIN | Jan. 1, 2018 02:00:00 | 192.168.1.2 | READ money.xls | N | 370c |
| account3 | BUS_ADMIN | Jan. 1, 2018 03:00:00 | 192.168.1.3 | READ passwords.txt | Y | 370d |
| account1 | IT_ADMIN | Jan. 1, 2018 04:00:00 | 192.168.1.1 | ACCESS ACCT | N | 370e |

DIFFERENTIATING BETWEEN ACTIVITIES OF MULTIPLE USERS USING SHARED ACCOUNTS TO ACCESS A COMPUTING SYSTEM

TECHNICAL FIELD

This application generally relates to security in a computing system. More particularly, aspects of this application are directed to tracking and analyzing user activity in a computing system, establishing the credentials of a user of the computing system, and using those credentials to establish the identity of the user.

BACKGROUND

As enterprise systems increase in size and scope, an increasing number of individuals (e.g., users and Information Technology ("IT") technicians) may manage and access an increasingly complex number of computing devices. While a personal computer may have a relatively small set of users (e.g., a family computer having an account for every member of the family), an enterprise system may have hundreds, if not thousands, of users, all with a variety of different needs and access permissions. For example, in a university setting, hundreds of students in an engineering department may desire access to circuit design tools on a network of servers, including the ability to, while using those circuit design tools, write circuit schematics to a hard drive and, if desired, delete circuit schematics from the hard drive.

User accounts on enterprise systems may have a variety of different permissions, which specify the ability of the user account to perform specific actions on the enterprise system. For example, in some operating systems users may have "read" permissions (e.g., the ability to read certain files), "write" permissions (e.g., the ability to write files to a specific location), and/or "execute" permissions (e.g., the ability to execute files in a specific location). To facilitate security, a user which does not need a certain permission (e.g., the ability to modify files in operating system directories) will typically not be provided the permission to do so. For example, on a family computer, parents may share an account with unrestricted access to perform any actions on any directory of the family computer, but the parents' children may each have an account limiting access to directories on the family computer containing homework material and kid-friendly games.

SUMMARY

The following summary presents a simplified summary of certain features. The summary is not an extensive overview and is not intended to identify key or critical elements.

Aspects of the present application describe a user identification utility used to monitor a computing system and detect activity by a shared account of the computing system. Based on the activity, the user identification utility may determine an identification of the user and an identification of the shared account. The user identification utility may additionally or alternatively determine additional information, such as an actions that the user takes using the shared account. The user identification utility may retrieve, from a user database, additional information about the user and/or the shared account. The user identification utility may store the information determined in an access database such that the identification of the user and the identification of the shared account are associated. The user identification utility may trigger an alert if the information determined satisfies a rule. The rule may be associated with the permissions of the user account and/or the shared account.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3 shows a portion of an example access database which may store data characterizing associations between user accounts and shared accounts.

DETAILED DESCRIPTION

Figure 1:
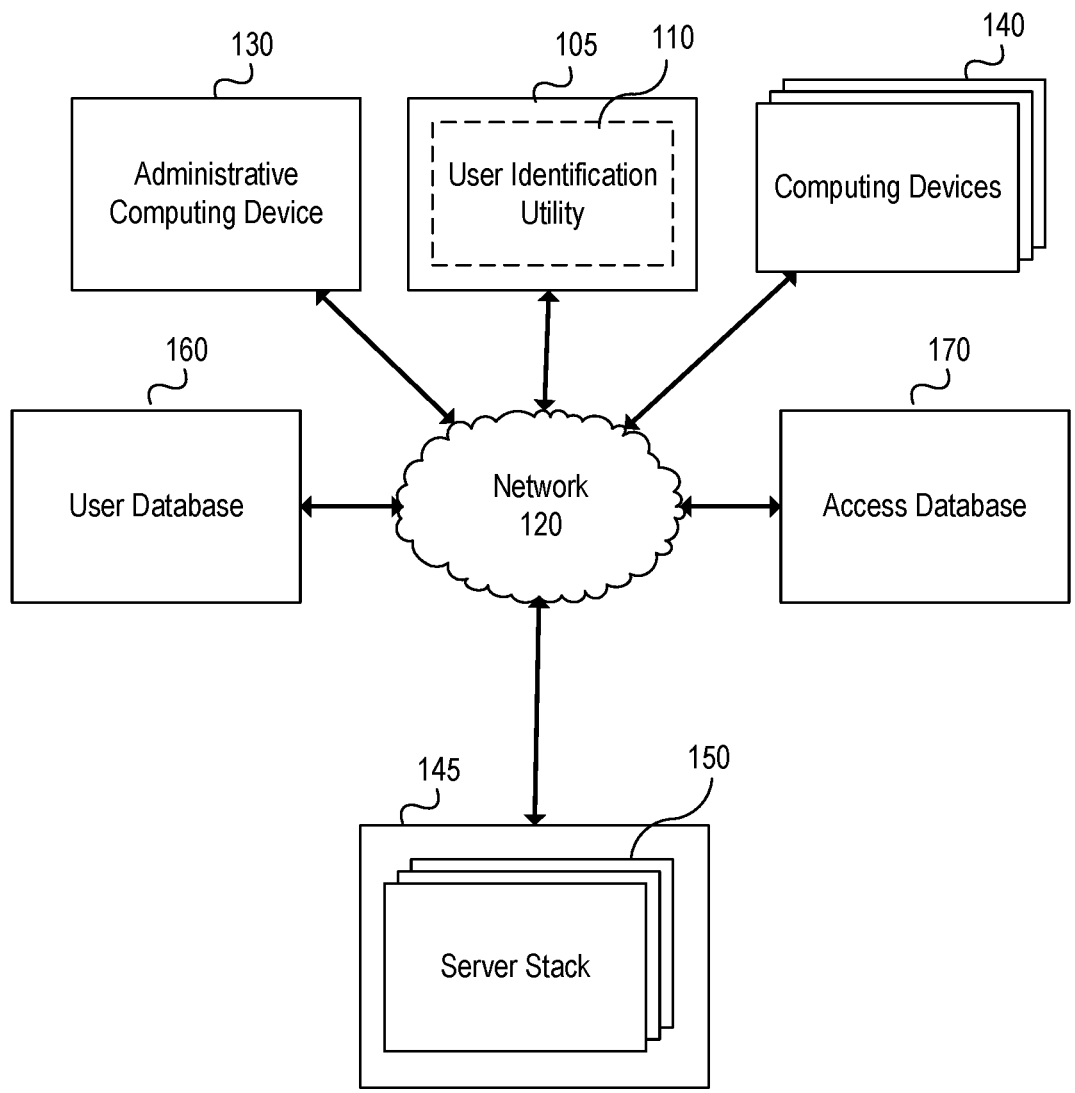
FIG. 1 shows an example computing environment within which different user accounts may be differentiated.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Enterprise systems may have shared accounts, which may be configured for access by a plurality of users and which may have permissions different than that of individual users. Users logged in to a system with an individual user account may access a shared account using a software tool (e.g., a powerbroker tool), which allows a user using a user account to initiate a session using a shared account. For example, an entire IT department in a company may share a "master" account which has elevated permissions allowing for the modification of operating system files, and individual users in the IT department may access the master account using their personal credentials and a powerbroker tool. Using this approach, rather than carefully managing permissions for a large number of different user accounts, a shared account may be provided elevated permissions, and user accounts may or may not be provided the ability to access the shared account as desired.

Such shared accounts pose a significant risk: significant harm may occur to a system as a result of use of a shared account. For example, during an emergency, an IT technician may log into a shared account an inadvertently delete or modify an operating system file. Many operating systems and software tools lack the ability to track access to and activities using a shared account by a user, such that, after a session using the shared account has ended, determining which user caused the shared account to perform a particular action may be impossible. This risk is compounded by the fact that many shared accounts have elevated permissions which, in some cases, may allow users to, using a shared account, delete log files and other data which documents the history of activities using the shared account.

The utility described herein enables administrators the ability to associate actions performed via a shared account to particular users. For example, an administrator may be able to determine that a particular user accessed a shared account and deleted a file. In so doing, the security of an enterprise system may be improved by better tracking actions taken on the enterprise system. The features described herein need not relate merely to determining the origin of undesirable actions using a shared account, but may also be used to track and reward actions using the shared account. For example, the features described herein may be used to track access by users to a shared account and reward users for their work on a computer system via the shared account (e.g., by rewarding a particular user for fixing a bug using the shared account).

By way of example, in some portions of this disclosure, features described herein will be explained in the context of a school enterprise comprising a large number of students and a server stack executing programs (e.g., engineering tools) which may be accessed by the students. The students may access such programs via one or more shared accounts, such as an account associated with particular class or department. An administrator of the enterprise may track student use of shared accounts such that, for example, a confused student's accidental deletion of system-critical files may be logged.

FIG. 1 shows an example computing environment within which a user identification utility may be utilized to monitor activities of users using a shared account. The computing environment may include, as shown by way of example in FIG. 1, a specially-programmed computing device 105 configured to identify and track use of shared accounts (hereinafter referred to as a user identification utility 110) connected by a network 120 to an administrative computing device 130, computing devices 140, a computing system 145 comprising a server stack 150 (referred to herein for simplicity as the server stack 150), a user database 160, and an access database 170.

The system depicted in FIG. 1 is by way of example only, and alternative configurations may be implemented in accordance with features described herein. Though devices such as the administrative computing device 130 and the user identification utility 110 are shown as separate in FIG. 1, any devices may be logically separated and may execute on the same computing device or devices. The devices shown in FIG. 1, such as the user identification utility 110, the administrative computing device 130, the computing devices 140, the server stack 150, the user database 160, and the access database 170, may comprise one or more computing devices, programs, processes, or other logical elements of a computing device. Such computing devices may be servers, personal computers, laptops, smartphones, set top boxes, or any other devices with processors and/or memory. For example, though the computing system 145 including the server stack 150 suggests a plurality of servers, the server stack 150 may also comprise laptops, personal computers, and similar computing devices.

The user identification utility 110 may monitor user activity on a computing system. The user identification utility 110 may monitor user activity on the server stack 150. The user identification utility 110 may additionally or alternatively monitor user activity on the computing devices 140 and/or the administrative computing device 130. Such monitoring may comprise retrieving and processing logs associated with the server stack 150. Though depicted by way of example in FIG. 1 as separate, the user identification utility 110 may be implemented in a variety of ways. The user identification utility 110 may be a process executing on the server stack 150. The user identification utility 110 may be additionally or alternatively implemented on a computing device (e.g., the specially programmed computing device 105).

The user identification utility 110 may be configured to monitor activity on the server stack 150. For example, the user identification utility 110 may be configured to detect log-on and log-off events associated with accounts (e.g., shared accounts), actions performed by the users (e.g., file additions, modifications, and/or deletions), shared account access by user accounts, and the like. As another example, the user identification utility 110 may analyze ongoing sessions associated with the server stack 150. As yet another example, the user identification utility 110 may be configured to prompt the server stack 150 to provide session logs at fixed intervals.

The network 120 may be any network, such as an Internet Protocol ("IP") network, which connects devices such as the user identification utility 110 and the server stack 150. The network may utilize one or more communication protocols and comprise one or more physical, wireless, and/or logical connections. The network may comprise public networks and private networks, and the private networks may connect to the public networks through computing devices such as modems and/or routers. For example, the server stack 150 may be distributed worldwide, such that the user identification utility 110 may connect via a first private network to a public private network and ultimately to a second private network to reach one or more servers of the server stack 150. The network 120 may facilitate communication through messages using any suitable communication protocol. For example, the user identification utility 110 may access the server stack 150 using IP messages.

The administrative computing device 130 may be configured to configure and manage the user identification utility 110. For example, the administrative computing device 130 may instruct which user events that the user identification utility 110 should detect and store and/or which events that the user identification utility 110 should ignore. The administrative computing device 130 may configure the user identification utility 110 by, for example, accessing an interface corresponding to the user identification utility 110 and providing commands to the user identification utility 110. The administrative computing device 130 may specify rules which, if met, trigger alerts by the user identification utility 110. The administrative computing device 130 may be configured to retrieve, from the user identification utility 110, a report comprising stored information about access to shared accounts.

The computing devices 140 may be devices which may access the server stack 150, the user database 160, and/or the access database 170. For example, the computing devices 140 may comprise student laptops which may, via the network 120, access the server stack 150, which may store programs for use in a particular class. As another example, the computing devices 140 may comprise network equipment, such as routers, which may store IP address information for other computing devices.

The user database 160 may comprise information about users, user accounts, and/or shared accounts. For example, the user database 160 may associate unique identifiers for users (e.g., user account numbers) with specific users' names, locations, organizational affiliations, and similar information. As another example, the user database 160 may comprise information about a shared account, including which users are permitted to access the shared account. The user database 160 may be configured to query one or more of the computing devices 140 to determine information (e.g., querying a router to determine the IP address of a particular user).

The server stack 150 may be one or more computing devices which may allow users to initiate sessions using shared accounts. Such computing devices may be logically or geographically remote relative to one another (e.g., such that the server stack 150 may comprise a distributed computing system) and/or may be logically or geographically local relative to each other (e.g., such that the server stack 150 may comprise multiple computing devices in a server rack), or the like. To provide a simple example, in FIG. 1, the server stack executes on the computing system 145. The server stack 150 may be a network of enterprise servers, a database server, or other similar computing devices. The server stack 150 may be configured to transmit user access information to the user identification utility 110 and/or may be configured to allow the user identification utility 110 to monitor user activity. The server stack 150 may comprise personal computers, web servers, smartphones, and the like. For example, various devices in the server stack 150 may comprise smartphones executing a mobile operating system and/or laptops executing an operating system.

The access database 170 may be a database of information relating to activity by users and/or shared accounts on the server stack 150. For example, the access database 170 may comprise a record of deletions by a user using a shared account, a listing of times when a user account logged in to and logged out of a shared account, and other similar user activities. As another example, the access database 170 may associate identifications of users (e.g., user accounts) with log-in and log-off times of shared accounts. The access database 170 may be a database stored on the same computing device (e.g., the specially-programmed computing device 105) which executes the user identification utility 110. The access database 170 may, for example, store entries in a database which may be queried using Structured Query Language ("SQL").

The access database 170 may provide shared account access information that may not otherwise be available. An administrator may determine, using the access database 170, when a user may have accessed a shared account and what actions may have been performed by the user using the shared account. The administrator may configure the user identification utility 110 to control the granularity of the information stored. For example, one access database 170 may only indicate log-on and log-off times corresponding to specific users and specific shared accounts, whereas another may indicate every single action (e.g., directory changes, file access information, and the like).

As one example of the access database 170, the access database 170 may correspond to specific high-security shared accounts, such as an emergency account for an IT department with elevated permissions enabling access to sensitive files. The user identification utility 110 may be configured to store all activity associated with the emergency account in the access database 170 such that, should a mistake be made accidentally deleting a sensitive file, the user that made the mistake could be identified.

As another example of the access database 170, the access database 170 may be configured to monitor access to a shared account such that rewards associated with access may be provided. For example, returning to the school example, the shared account may be configured to provide students access to recorded classroom lectures. Students may be expected to, using the shared account, access the recorded classroom lectures for a certain period of time (e.g., at least the total length of all recorded classroom lectures). The user identification utility 110 may be configured to monitor individual students' access to the shared account and, based on entries stored in the access database 170, determine a total length of access time corresponding to a particular student. A student that has accessed the recorded classroom lectures for a certain period of time may be rewarded.

Figure 2:
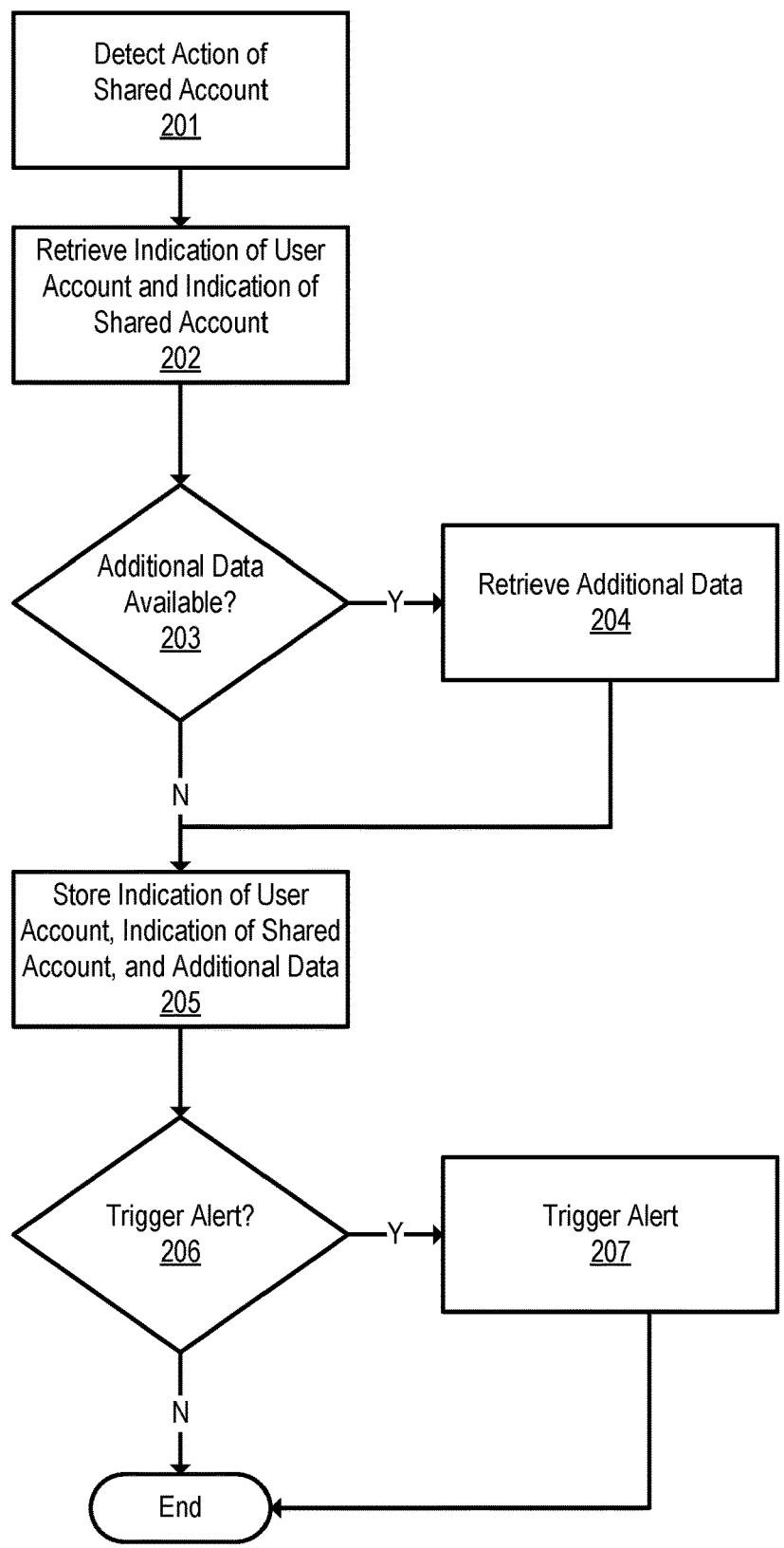
FIG. 2 shows a flow chart with example method steps for monitoring access of a shared account on a computing device.

FIG. 2 depicts a flow chart of example method steps for monitoring access of a shared account on a computing device. In step 201, the user identification utility 110 may detect any action corresponding to a shared account. A shared account may comprise any account which may provide, to multiple users, access to a computing system, a particular computing device, or a particular computing resource. The action may comprise logging into the shared account, using a software tool (e.g., a powerbroker) to access the shared account, and/or instantiating a session involving the shared account. Actions performed by a shared account may further comprise, for example, adding a file, reading a file, deleting a file, browsing directories, or other computing activities.

Returning to the school example, a shared account may be a class account used by students in the class to access a computer in a classroom. The students in the classroom may access the shared account by first logging in using a personal account (e.g., using their school ID) and then access, using a powerbroker or similar software, the shared account. The students may then execute a file on a hard disk using the shared account. Both the students' access to the shared account and the execution of the file may be detected by the user identification utility 110.

The user identification utility 110 may detect shared account activity on a computing device (such as the server stack 150) by monitoring the computing device. The user identification utility 110 may monitor the server stack 150 by, for example, requesting and receiving shared account activity data at regular intervals (e.g., every 10 minutes), irregular intervals, and/or as triggered by the shared account activity. Monitoring may comprise retrieving and processing one or more log files associated with a shared account. Monitoring may additionally or alternatively include monitoring (e.g., scraping) information stored in Random Access Memory ("RAM") in the server stack 150. Alternative methods may be implemented based on the impact of the monitoring on the server stack 150. For example, log file monitoring may be performed on low-risk devices in order to minimize the potential impact to processing resources on the low-risk devices, whereas high-risk devices may be monitored using more processing-intensive mechanisms, such as RAM scraping.

In step 202, the user identification utility 110 may determine information about the user account associated with the access to the shared account. The user identification utility 110 may determine an indication of the user account (e.g., a username of the user account) and an indication of the shared account (e.g., a username of the shared account). The user identification utility 110 may additionally determine information about account activity and other similar details from the server stack 150. For example, the user identification utility 110 may determine that a specific user accessed a specific shared account at a specific time in order to delete a specific file. As another example, the user identification utility 110 may retrieve session data, console output, images of graphical user interface elements, or any similar output which may be associated with the access to the shared account. Such session data may comprise information stored by the server stack 150 (e.g., one computing device of the server stack 150) associated with the use of the user account and/or the shared account, such as an indication of either the user account and/or shared account as stored in RAM.

The user identification utility 110 may determine information about the user account by retrieving session data from the server stack 150. For example, a first computing device of the server stack 150 may have three users currently using one or more services. The user identification utility 110 may retrieve identification information for all three users of the first computing device, rather than attempting to determine which particular user accessed a shared account. Additionally or alternatively, the user identification utility 110 may deduce which user was likely to have accessed the shared account based on current activity of the user account. Based on the deduction, the user identification utility 110 may select a user account from the multiple user accounts accessing the server stack 150. For example, the user identification utility 110 may detect access to a file using a shared account and, based on determining that a first user recently used the shared account to access a directory containing the file, deduce that the first user is likely the one accessing the file using the shared account.

In step 203, the user identification utility 110 may determine if additional data corresponding to the user identification retrieved in step 202 is available. The user identification utility 110 may query the user database 160 for additional data. The query may comprise the indication of the user account and/or the shared account as determined in step 202. Additional data may comprise a first and/or last name of a user, an organization associated with the user, one or more timestamps, permissions, or other information relevant to the user's access to the shared account. For example, an enterprise may assign users unique usernames for accessing computing devices such that determining a user's full name may require querying the user database 160, and the user identification utility 110 may determine if such information is available by querying the user database 160 with an indication of the user. Additional information may additionally or alternatively be stored on and retrieved from the computing devices 140. For example, one of the computing devices 140 may be a router which knows the IP address of the user attempting to access a shared account on the server stack 150. If such information is available, the user identification utility 110 may retrieve such information in step 204 and proceed to step 205. If such information is not available, the process, in this example, continues to step 205.

In step 205, the user identification utility 110 may store the indication of the user, the indication of the shared account, and, if retrieved, the additional data. The information may be stored in the access database 170. An entry may include data characterizing an association between a user (e.g., a username and/or full name), an indication of a shared account accessed by the user, an action of the user (e.g., deletion of a file), an IP address of the user, and/or a timestamp. The access database 170 may be configured to, using the user identification utility 110 or otherwise, generate access reports corresponding to one or more shared accounts. For example, the access database 170 may generate reports (e.g., automatically or on-demand) indicating which users accessed which shared accounts and what activities those shared accounts were used for.

In step 206, the user identification utility 110 may determine whether to trigger an alert based on whether the indication of the user, the indication of the shared account, and/or the additional data satisfy a rule. If the user identification utility 110 decides to trigger an alert, the user identification utility 110 may trigger an alert in step 207. Otherwise, the process may end.

A rule may be associated with the permissions of a user account and/or associated with permissions of a shared account. The user identification utility 110 may, for example, be configured to trigger an alert if a user without permission to a shared account attempts to access the shared account. As another example, the user identification utility 110 may be configured to trigger an alert if a specific user or a specific shared account performs a deletion.

A rule may be associated with a particular file, directory, or other portion of all or portions of the server stack 150 accessed by the shared account. For example, if a particularly sensitive file is accessed, the user identification utility 110 may trigger an alert. As another example, the user identification utility 110 may be configured to trigger an alert when certain shared accounts (e.g., financial department shared accounts) perform operations on files not associated with that account (e.g., health department documents). As yet another example, an alert may be triggered for any access to a first server of the server stack 150, but not a second server of the server stack 150.

A rule may be associated with a specific action. For example, all file deletions may trigger an alert. As another example, failed attempts at access to a shared account (e.g., a user not authorized to access a shared account attempting to access the shared account) may trigger an alert.

A rule may be associated with the computing device of the user associated with the shared account. Access to a shared account from a particular location (e.g., a foreign country) may trigger an alert. Access to a shared account from a particular type of computing device (e.g., a smartphone) may trigger an alert.

A rule may be configured to be conditioned on multiple actions. For example, a user which created a file using a shared account may delete the same file without the user identification utility 110 triggering an alert. As another example, a single file deletion may not trigger an alert, but multiple file deletions in succession may trigger an alert.

The user identification utility 110 may additionally or alternatively be configured to modify permissions corresponding to users and/or shared accounts based on entries in the access database 170 and/or whether the indication of the user, the indication of the shared account, and/or the additional data satisfy a rule. For example, the user identification utility 110 may remove a permission from a shared account based on a determination that current activity by the user account appears risky. As another example, the user identification utility 110 may prevent a user account from using a powerbroker to access a shared account based on a determination that the user frequently accidentally deletes content using the shared account.

FIG. 3 shows a portion of an example access database which may store data characterizing associations between user accounts and shared accounts. The access database 300 may be the same as or at least similar to the access database 170 discussed above with reference to FIG. 1. The access database 300, in this example, includes a table with multiple columns 310-360. A first column 310 corresponds to the user ID, in which entries may include the indication of a user. A second column 320 corresponds to the shared account ID, in which entries may include the indication of a shared account. A third column 330 corresponds to time, wherein entries may include a timestamp corresponding to when the user accessed the shared account. A fourth column 340 corresponds to an IP address, wherein entries may include the IP address of the user's device when accessing the shared account. A fifth column 350 corresponds to an action, wherein entries may include an indication of the account action taken associated with the user account, such as reading or deleting a file on the server stack 150. A sixth column 360 corresponds to an alert, in which entries may indicate whether the user identification utility 110 generates an alert based on the entry. Though only six columns are shown in the example access database 300, any numbers of columns, rows, data types, or database formats may be used in accordance with the features described herein.

The access database 300 may also include, based on information obtained by the user identification utility 110, indications of instances in which a user has accessed a shared account. In the example shown in FIG. 3, the access database 300 includes five rows that each indicate individual instances of access to a shared account by a user.

In row 370a, for example, the entry indicates that "account1" accessed the shared account "IT_ADMIN" at midnight from the IP address 192.168.1.1 and added a file called "diagram.jpg." Such an entry may have been made responsive to a user, using account ID "account1" and using a powerbroker to access the shared account "IT_ADMIN," creating a file called "diagram.jpg." The row 370a thus provides an association between a user account (e.g., "account1"), a shared account (e.g., "IT_ADMIN"), and a particular action (creating "diagram.jpg"), such that an administrator or other user may later use this information to determine, for example, the creator of "diagram.jpg." Without such an association, the administrator may not have known who created "diagram.jpg" and/or who accessed the "IT_ADMIN" shared account. Returning to the school example, "diagram.jpg" may have been a school assignment wherein the student forgot to write their name, and the teacher may use the entry to determine that the student created the assignment using the shared account.

In row 370b, the entry indicates that the same user from row 370a deleted the file "diagram.jpg" at 1:00 AM. This does not trigger an alert because the user created the file, suggesting little harm to other users of the shared account. The user identification utility 110 may be configured to allow users to add and delete files at will without triggering an alert, particularly where a user that formerly made a file later deletes it.

In row 370c, a user using the account "account2" accesses the shared account "BUS_ADMIN" at 2:00 AM using the IP address 192.168.1.2 and reads a file called "money.xls." No alert is generated because, for example, the business account may have adequate permissions to access money-related files. As a contrasting example, if the same user tried to access the file "money.xls" using the shared account "IT_ADMIN," an alert may be generated.

In row 370d, a user using the account "account3" accesses the shared account "BUS_ADMIN" at 3:00 AM using IP address 192.168.1.3 to read a file called "passwords.txt." Based on this access, an alert is triggered. This alert may be because the shared account "BUS_ADMIN" has no permission to access the file "passwords.txt," because the user account "account3" has no permission to access "passwords.txt," or other similar reasons. The entry depicted in row 370d need not suggest that the user was granted access to passwords.txt; rather, the entry may simply indicate that the user attempted to access the file.

In row 370e, a user using the account "account1" may access the shared account "IT_ADMIN" at 4:00 AM using the IP address 192.168.1.1. In this case, the user is merely accessing the shared account using, for example, a power broker. Such instances may be logged, as is shown in row 370e. The entry in row 370e may only suggest that access to the account was attempted, such that failed attempts may also be shown. Moreover, because both access to a shared account and actions using the shared account may be logged, the access database 300 may have a plurality of entries corresponding to a session instantiated by a user with regard to a shared account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, random access memory ("RAM"), and the like. The functionality of the program modules may be combined or distributed as desired in various embodiments. In addition, the functionality may be embodied in whole or in part in firmware or hardware equivalents, such as integrated circuits, application-specific integrated circuits ("ASICs"), field programmable gate arrays ("FPGA"), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

Although examples are described above, features and/or steps of those examples may be combined, divided, omitted, rearranged, revised, and/or augmented in any desired manner. Various alterations, modifications, and improvements will readily occur to those skilled in the art. While some elements may be expressed as singular or plural, such elements may be either singular or plural in various embodiments. For example, though one user identification utility 110 is described, multiple dynamic user interface computing platforms may be used in accordance with the features described herein. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   detecting, by a computing device, an action associated with a shared account of a computing system, wherein the shared account is configured to provide, to a plurality of users, access to the computing system, and wherein a first user associated with a first user account of the computing system caused the action via the shared account;
   retrieving, by the computing device, from the computing system and after detecting the action, session data, wherein the session data comprises an indication of a plurality of user accounts currently accessing a service on the computing system, each user account associated with a different user and the plurality of user accounts including the first user account, and an indication of the shared account;
   analyze the session data to identify an indication of the first user account associated with the first user that caused the action via the shared account;
   retrieving, by the computing device, from a user database and based on the indication of the first user account, additional information corresponding to the first user; and
   storing, by the computing device and in an access database different from the user database, data characterizing an association between:
      the indication of the first user account,
      the indication of the shared account,
      the additional information corresponding to the first user, and
      an indication of the action associated with the shared account;
   determine, from the session data, a length of access time by the first user account;
   determine that the length of access time is greater than a predetermined time period;
   identify, based on the additional information corresponding to the first user, a name of the first user;
   generate a reward for the first user based on the determination that the length of access time is greater than the predetermined time period; and
   transmit the reward to the first user.

2. The method of claim 1, further comprising:
   sending, by the computing device and based on the association satisfying a rule, an alert.

3. The method of claim 2, wherein the rule is associated with permissions of the first user account or permissions of the shared account.

4. The method of claim 1, further comprising:
   modifying, by the computing device and based on the data characterizing the association, permissions of the first user account or permissions of the shared account.

5. The method of claim 1, wherein a first set of permissions granted for the shared account is different than a second set of permissions granted for the first user account.

6. The method of claim 1, wherein retrieving the session data comprises retrieving a log file from the computing system.

7. The method of claim 1, further comprising:
   retrieving, by the computing device from a second computing device and based on the indication of the first user account, an Internet Protocol (IP) address associated with the first user account, wherein the data characterizing the association comprises the IP address.

8. The method of claim 1, further comprising:
   retrieving, by the computing device, an image of a graphical user interface corresponding to the action; and
   saving, by the computing device and in the access database, the image, wherein the image is associated with the first user account.

9. A computing device comprising:
   one or more processors; and
   memory storing instructions that, when executed by the one or more processors, cause the computing device to:
      detect an action associated with a shared account of a computing system, wherein the shared account is configured to provide, to a plurality of users, access to the computing system, and wherein a first user associated with a first user account of the computing system caused the action via the shared account;
      retrieve, from the computing system and after detecting the action, session data, wherein the session data comprises an indication of a plurality of user accounts currently accessing a service on the computing system, each user account associated with a different user and the plurality of user accounts including the first user account and an indication of the shared account;
      analyze the session data to identify an indication of the first user account associated with the first user that caused the action via the shared account;
      retrieve, from a user database and based on the indication of the first user account, additional information corresponding to the first user; and
      store, in an access database different from the user database, data characterizing an association between:
         the indication of the first user account,
         the indication of the shared account,
         the additional information corresponding to the first user, and
         an indication of the action associated with the shared account;
      determine, from the session data, a length of access time by the first user account;
      determine that the length of access time is greater than a predetermined time period;
      identify, based on the additional information corresponding to the first user, a name of the first user;
      generate a reward for the first user based on the determination that the length of access time is greater than the predetermined time period; and
      transmit the reward to the first user.

10. The computing device of claim 9, wherein the instructions, when executed by the one or more processors, further cause the computing device to:
    send, based on the association satisfying a rule, an alert.

11. The computing device of claim 10, wherein the rule is associated with permissions of the first user account or permissions of the shared account.

12. The computing device of claim 9, wherein the instructions, when executed by the one or more processors, further cause the computing device to:
    modify, based on the data characterizing the association, permissions of the first user account or permissions of the shared account.

13. The computing device of claim 9, wherein a first set of permissions granted for the shared account is different than a second set of permissions granted for the first user account.

14. A system comprising:
a computing device;
one or more shared accounts configured to provide, to a plurality of users, access to the computing device; and
a user identification utility, configured to:
  detect an action associated with a shared account of the one or more shared accounts, wherein a first user associated with a first user account of the computing system caused the action via the shared account;
  retrieve, from the computing system and after detecting the action, session data, wherein the session data comprises an indication of a plurality of user accounts currently accessing a service on the computing system, each user account associated with a different user and the plurality of user accounts including the first user account and an indication of the shared account;
  retrieve, from a user database and based on the indication of the first user account, additional information corresponding to the first user; and
  store, in an access database different from the user database, data characterizing an association between:
    the indication of the first user account,
    the indication of the shared account,
    the additional information corresponding to the first user, and
    an indication of the action associated with the shared account;
  determine, from the session data, a length of access time by the first user account;
  determine that the length of access time is greater than a predetermined time period;
  identify, based on the additional information corresponding to the first user, a name of the first user;
  generate a reward for the first user based on the determination that the length of access time is greater than the predetermined time period; and
  transmit a reward to the first user based on the length of access time.

15. The system of claim 14, wherein the user identification utility is further configured to:
  send, based on the association satisfying a rule, an alert.

16. The system of claim 15, wherein the rule is associated with permissions of the first user account or permissions of the shared account.

17. The system of claim 14, wherein the user identification utility is further configured to:
  modify, based on the data characterizing the association, permissions of the first user account or permissions of the shared account.

18. The system of claim 14, wherein a first set of permissions granted for the shared account is different than a second set of permissions granted for the first user account.

* * * * *